United States Patent
Kawamura et al.

(10) Patent No.: US 6,587,911 B1
(45) Date of Patent: Jul. 1, 2003

(54) ELECTRONIC DEVICE AND DATA COMMUNICATION METHOD

(75) Inventors: Harumi Kawamura, Tokyo (JP); Yasuhiro Takada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/551,226

(22) Filed: Apr. 17, 2000

(30) Foreign Application Priority Data

Apr. 23, 1999 (JP) .......................................... 11-116681

(51) Int. Cl.[7] .............................................. G06F 13/36
(52) U.S. Cl. ...................................................... 710/315
(58) Field of Search ............................ 710/315, 65–74; 709/230, 246, 247; 341/50; 370/446

(56) References Cited

U.S. PATENT DOCUMENTS

| | | | | |
|---|---|---|---|---|
| 6,070,196 A | * | 5/2000 | Mullen, Jr. | 709/250 |
| 6,111,893 A | * | 8/2000 | Volftsun et al. | 370/466 |
| 6,124,854 A | * | 9/2000 | Sartain et al. | 345/716 |
| 6,208,904 B1 | * | 3/2001 | Mullen, Jr. | 700/9 |
| 6,233,611 B1 | * | 5/2001 | Ludtke et al. | 709/223 |
| 2002/0133610 A1 | * | 9/2002 | Hadland | 709/230 |

FOREIGN PATENT DOCUMENTS

EP 1079354 A2 * 2/2001 ............ G08G/1/09

* cited by examiner

Primary Examiner—Paul R. Myers
(74) Attorney, Agent, or Firm—Jay N. Maioli

(57) ABSTRACT

Apparatus for use when a format which can be transmitted by a transmission device is not equal to a format which can be received by a reception device that makes it possible to correctly perform data transmission includes a controller for controlling transmission that determines a transmission format with reference to a transmittable format of a source device and a receivable format of a destination device and instructs the source device to perform data transmission in the determined transmission format. When the data format which can be transmitted by the source device cannot be received by the destination device, the controller determines a transmission data format with reference to a data format which can be converted by a format converter connected to a bus and having a data format converting function and instructs the source device to transmit data to the format converter. The format converter which receives the data transmits the data to the destination device.

15 Claims, 9 Drawing Sheets

FIG. 1
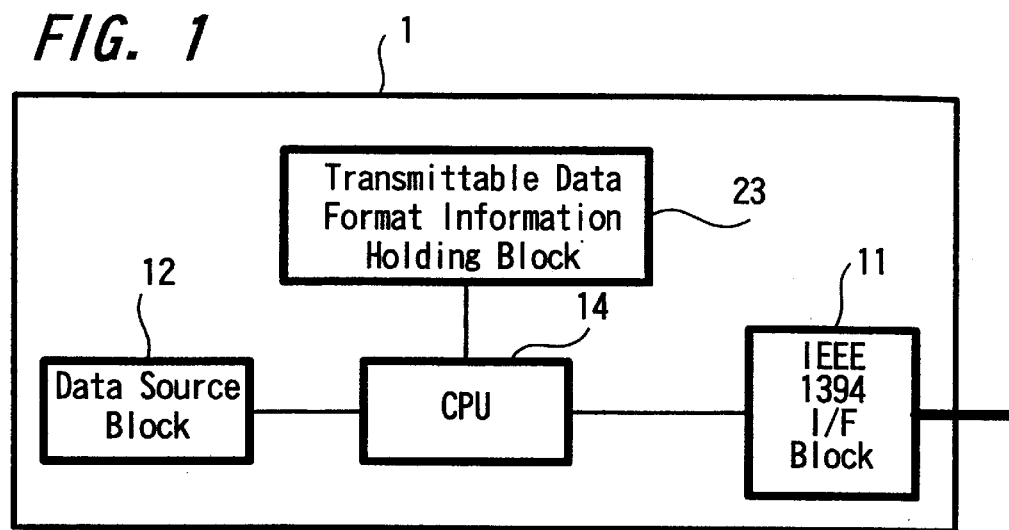
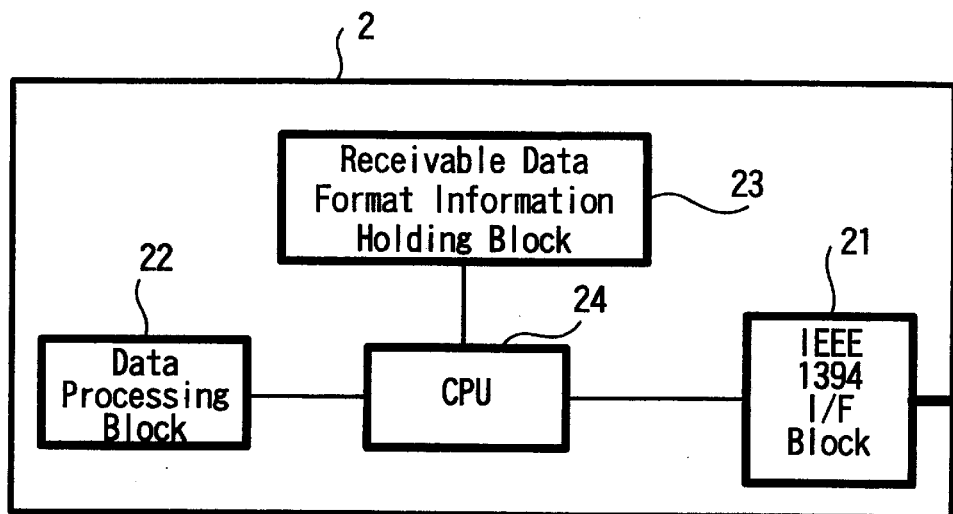
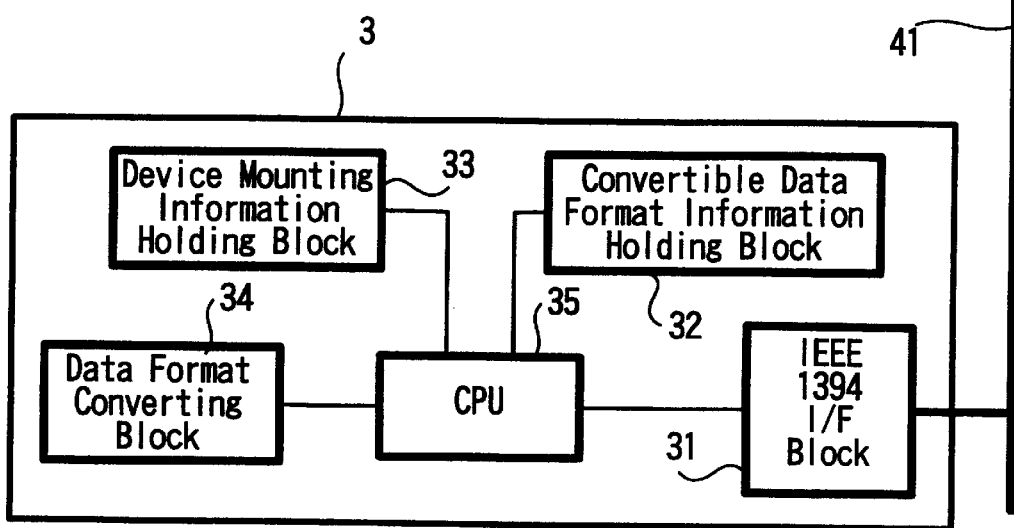

FIG. 5 subunit identifier descriptor structure

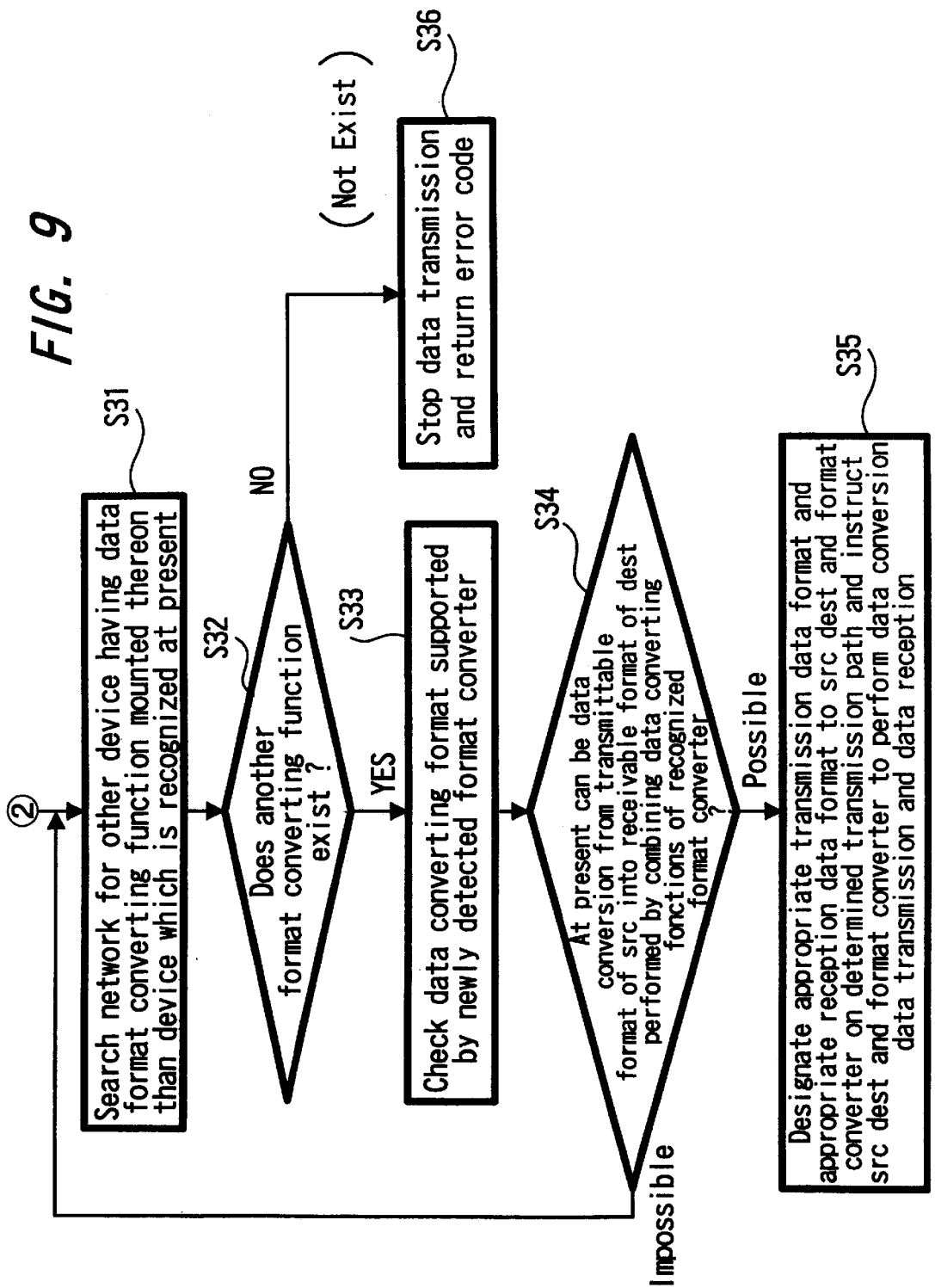

ELECTRONIC DEVICE AND DATA COMMUNICATION METHOD

BACKGROUND OF THE INVENTION

1. Field of the Invention

The present invention relates to a network in which a plurality of electronic devices are connected through a high-speed serial bus (to be referred to as an IEEE 1394 bus hereinafter) or the like conforming to IEEE 1394 to perform communication among these electronic device and, more particularly, to a method and apparatus being capable of coping with a case in which the transmission data formats of a transmission-side device and a reception-side devices have mismatching in data transmission.

2. Description of the Related Art

A network for connecting electronic devices (to be referred to as devices hereinafter) such as a digital video cassette recorder, a digital still camera, a personal computer, a printer, and the like to each other through an IEEE 1394 bus to perform communication among these devices is conceivable.

In the network (to be referred to as an IEEE 1394 network) in which the plurality of devices are connected through the IEEE 1394 bus, transmission of data or a control signals is performed by time sharing multiplexing every predetermined communication cycle. As forms of communication in one communication cycle, the form of isochronous (to be referred to as Iso hereinafter) communication for transmitting video data, audio data, or the like on real time and the form of asynchronous (to be referred to as Async hereinafter) communication for occasionally transmitting a control signal such as an operation control command, a connection control command, or the like of a device as needed are known.

When print data supply device on an IEEE 1394 network supplies print data to a printer device to instruct the printer device to perform a print operation, the print data supply device must prepare and transmit data according to a data format in which the printer device can perform reception and printing.

The print data supply device must change the format of print data to be transmitted depending on a printer device serving as a print data destination. When a plurality of print data supply devices are connected to a network, all these devices must have functions for converting print data formats. As a result, the same functions are located at a plurality of positions on the network, and the resources are minimally used.

When the print data supply device cannot transmit data according to a data format in which the printer device can perform reception and printing, the printer device cannot print designated data disadvantageously.

SUMMARY OF THE INVENTION

The present invention has been made in consideration the conditions, and has as its object to provide a method and apparatus in which, when a data transmission device and data reception device are connected to an IEEE 1394 network, when the data reception device cannot cope with a data format in which the data transmission device can output data, the format of data to be transmitted is converted into an appropriate format, and the data is transmitted to the data reception device.

A device according to the first aspect of the present invention includes: acquisition means for acquiring data format information of data which can be processed by a first electronic device on a network and data format information of data which can be processed by a second electronic device on the network; decision means for deciding, on the basis of the acquired data format information, whether the data which can be processed by the first electronic device can be processed by the second electronic device or not; searching means for, if it is decided by the decision means that the data which can be processed by the first electronic device cannot be processed by the second electronic device, searching for an electronic device which can convert the data which can be processed by the first electronic device into the data having a format which can be processed by the second electronic device; and control means for, when the electronic device which can convert the data which can be processed by the first electronic device into the data having the format which can be processed by the second electronic device is detected by the searching means, controlling the first electronic device to output data to the detected electronic device and controlling the detected electronic device to convert the data and to output the data to the second electronic device.

An electronic device according to the second aspect of the present invention on a communication network having a bus and a plurality of electronic devices connected to the bus, including: means for checking a function mounted on an electronic device on the network; means for instructing and controlling the other device on the network to transmit data, and means for holding the information of the format of convertible data.

An electronic device according to the third aspect of the present invention on a communication network having a bus and a plurality of electronic devices connected to the bus, including: inputting means which receives a control signal from another device; means for converting the format of data transmitted through the bus; and means for holding the information of the format of convertible data.

A first data communication method according to the present invention including: the acquisition step of acquiring data format information of data which can be processed by a first electronic device on a network and data format information of data which can be processed by a second electronic device on the network; the decision step of deciding, on the basis of the acquired data format information, whether the data which can be processed by the first electronic device can be processed by the second electronic device or not; the searching step of, if it is decided in the decision step that the data which can be processed by the first electronic device cannot be processed by the second electronic device, searching for an electronic device which can convert the data which can be processed by the first electronic device into the data having a format which can be processed by the second electronic device; and the control step of, when the electronic device which can convert the data which can be processed by the first electronic device into the data having the format which can be processed by the second electronic device is detected by the searching step, controlling the first electronic device to output data to the detected electronic device and controlling the detected electronic device to convert the data and to output the data to the second electronic device.

In a second data communication method according to the present invention for performing data communication on a communication network having a bus and a plurality of devices connected to the bus, a controller acquires the information a transmittable data format of a source device and the information of receivable data format of a destination device, and determines a transmission data format on the basis of the information, instructs the source device to perform data communication by the determined data format, and, when the transmittable data format of the source device cannot be received by the destination device, the controller determines a transmission data format with reference to a data format which can be converted by a format converter connected to the bus and having a data format converting function and instructs the source device to transmit data to the format converter, and the format converter which receives the data transmits data to the destination device.

A system according to the present invention includes a third electronic device for acquiring data format information of data which can be processed by a first electronic device on a network and data format information of data which can be processed by a second electronic device on the network, and the third electronic device has: decision means for deciding, on the basis of the acquired data format information, whether the data which can be processed by the first electronic device can be processed by the second electronic device or not; searching means for, if it is decided by the decision means that the data which can be processed by the first electronic device cannot be processed by the second electronic device, searching for an electronic device which can convert the data which can be processed by the first electronic device into the data having a format which can be processed by the second electronic device; and control means for, when the electronic device which can convert the data which can be processed by the first electronic device into the data having the format which can be processed by the second electronic device is detected by the searching means, controlling the first electronic device to output data to the detected electronic device and controlling the detected electronic device to convert the data and to output the data to the second electronic device.

A recording medium according to the present invention includes a program for performing communication recorded thereon, and the program realizes: the acquisition step of acquiring data format information of data which can be processed by a first electronic device on a network and data format information of data which can be processed by a second electronic device on the network; the decision step of deciding, on the basis of the acquired data format information, whether the data which can be processed by the first electronic device can be processed by the second electronic device or not; the searching step of, when it is decided in the decision step that the data which can be processed by the first electronic device cannot be processed by the second electronic device, searching for an electronic device which can convert the data which can be processed by the first electronic device into the data having a format which can be processed by the second electronic device; and the control step of, when the electronic device which can convert the data which can be processed by the first electronic device into the data having the format which can be processed by the second electronic device is detected by the searching step, controlling the first electronic device to output data to the detected electronic device and controlling the detected electronic device to convert the data and to output the data to the second electronic device.

In the present invention, at a certain point of time, a device for transmitting data on a network is defined as a source device, and a device for receiving data and performing a process is defined as a destination device. A device for instructing and controlling a device connected to the network to perform data transmission is defined as a controller. A format converter having a data format converting function may be connected to a bus as a device independently of the source device, the destination device, and the controller.

Transmission of data from the source device to the destination device is performed by an instruction from the controller. The source device has a list of transmittable data formats as device information, and the destination device has a list of receivable and processible data formats as device information.

When the controller instructs the source device to perform data transmission from the source device to the destination device, the controller acquires the information of a transmittable data format of the source device and the information of a receivable data format of the destination device, determines a data format being appropriate to transmission on the basis of the information, and instructs the source device to perform data transmission to the destination according to a designated format.

When the appropriate format cannot be detected, the controller determines a data format for transmission of the source device and a data format for reception of the destination device with reference to data format information which can be changed by a format converter, and the controller instructs the source device to transmit data to the format converter in the data format. The format converter which receives the data converts data format into a format which can be received by the destination device, and transmits the data to the destination device.

BRIEF DESCRIPTION OF THE DRAWINGS

FIG. 1 is a block diagram showing a configuration of an IEEE 1394 network;

FIG. 9 is the other part of the flow chart showing the case in which data is transmitted from the source device to the destination device.

DETAILED DESCRIPTION OF THE PREFERRED EMBODIMENTS

Figure 2:
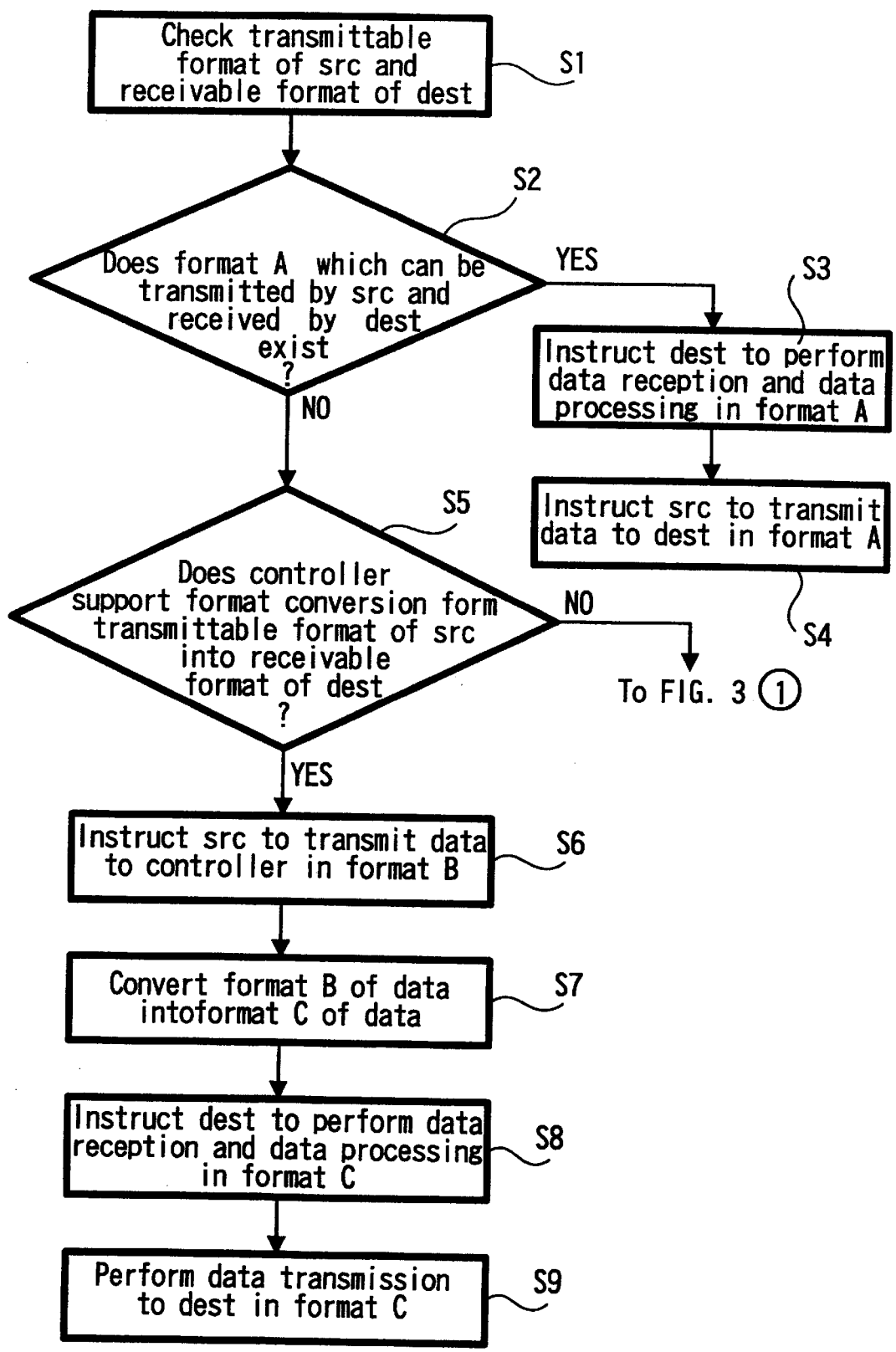
FIG. 2 is one part of a flow chart showing a case in which data is transmitted from a source device to a destination device.

Embodiments of the present invention will be described below with reference to the accompanying drawings. A system configuration serving as an assumption for explaining the embodiments will be described below with reference to FIGS. 1 to 6. FIG. 1 is a block diagram showing the configuration of an IEEE 1394 network. As shown in FIG. 1, a source device 1, a destination device 2, and a controller (control device) 3 are connected to a IEEE 1394 bus 4. The devices comprises IEEE 1394 interface blocks 11, 21, and 31 which are interfaces for accessing the other devices on the network through the IEEE 1394 bus 4.

At a ceratin point of time, a device for transmitting data on the IEEE 1394 network is defined as a source device. As shown in FIG. 1, the source device 1 comprises, as hardware, an IEEE 1394 interface block 11, a data source block 12, a block 13 for holding the information of transmittable data format, and a CPU 14.

At a certain point of time, a device for receiving data on the IEEE 1394 network is defined as a destination device. As shown in FIG. 1, the destination device 2 comprises, as hardware, the interface block 21, a data processing block 22, a block 23 for holding the information of the format of receivable data, and a CPU 24.

A device for instructing the devices on the IEEE 1394 network to perform data transmission and for controlling the devices is defined as a controller. As shown in FIG. 1, the controller (control device) 3 is a device which exists as one element on the IEEE 1394 network. The controller 3 comprises hardware for realizing functions (to be described later), i.e., the IEEE 1394 interface block 31, a block 32 for holding format information for making it possible to perform format conversion, a block 33 indicating that a device has a controller mounted thereon, a data format converting block 34, and a CPU 35. The CPU 35 has a memory, and a program for realizing the present invention is recorded on the memory.

The software configurations of the devices will be described below.

Functions held by the devices will be described below.

When the source device receives a command for data transmission together with parameters such as data format and a data transmission destination from an external device, the source device starts data transmission to the designated transmission destination in the designated format. In addition, according to a request from an external device, the source device provides the information of the format of transmittable data.

When a reception data format is designated by an external device, the destination device sets up a reception buffer (CSR space to be described later) to prepare reception in the designated format, and receives data. According to a request from an external device, the destination device provides the information of a receivable data format.

The controller has functions described in items (1) to (6):
(1) the function for checking functions mounted on the devices on the network;
(2) the function for converting the format of data;
(3) the function for instructing and controlling the devices on the network to perform data transmission;
(4) the function, having the information of a convertible data format, for providing the information according to a request;
(5) the function for transmitting and receiving data; and
(6) the function for controlling the operations of a device for transmitting data and a device for receiving data, and the source device is instructed by the controller to transmit data from the source device to the destination device.

Figure 3:
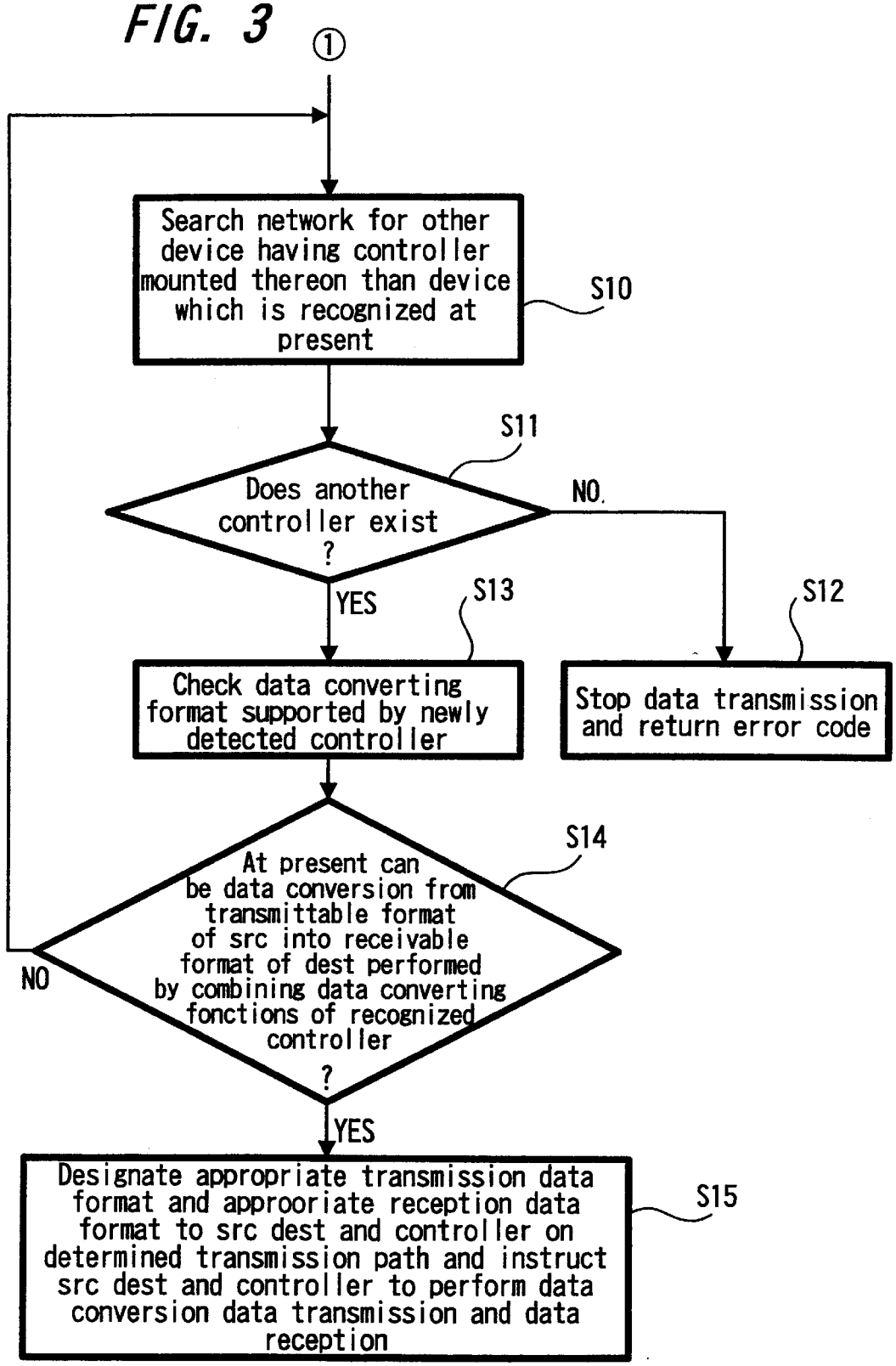
FIG. 3 is the other part of the flow chart showing the case in which data is transmitted from the source device to the destination device.

A flow chart showing a case in which data is actually transmitted from the source device to the destination device is shown in FIGS. 2 and 3. In this flow chart, reference symbol "src" denotes a source device, reference symbol "dest" denotes a destination device, and reference symbol "controller" denotes a controller.

The controller acquires the information of a transmittable data format of the source device and the information of a receivable data format of the destination device when the controller instructs the source device to perform data transmission from the source device to the destination device (step S1).

On the basis of the information, it is checked whether a data format (defined as a format A) which can be transmitted by the source device and can be received by the destination device exists (step S2). If the format A exists, the controller informs the destination device of the format of data transmitted from the source device, instructs the destination device to receive the data in the format (step S3), and instructs the source device to transmit the data to the destination device in the corresponding format (step S4).

In step S2, if the format A cannot be detected, the controller interrupts preparation for data transmission from the source device to the destination device to try to convert a data format.

More specifically, it is checked whether format conversion from a transmittable data format of the source device into a receivable data format of the destination device is supported by the controller itself (step S5). If the format conversion is supported, the controller instructs the source device to transmit data to the controller in a format (defined as a format B) which can be converted by the controller (step S6). The controller which receives the data converts the data format into a format (defined as a format C) which can be received by the destination device (step S7), instructs the destination device to receive and process data in the format C (step S8), and transmits the data to the destination device in the format C (step S9).

If it is determined in step S5 that the controller cannot convert the data format which can be transmitted by the source device into the data format which can be received by the destination device, the controller (to be referred to as a controller A hereinafter) searches for another controller (to be referred to as a controller B) on the network (steps S10 and S11). If the controller B exists (YES in step S11), the controller A acquires the information of a format conversion table of the controller B (step S13), and the controller A uses the format converting functions of the controller A and the controller B to check whether the format can be converted into a format in which data can be transmitted from the source device to the destination device (step S14). If possible (YES in step S14), format conversion is performed by using both or one of the functions of the controller A and the controller B, and the data is transmitted from the source device to the destination device (step S15).

If the desired format conversion cannot be performed even by using the converting functions of the controllers A and B (NO in step S14), the controller A searches for still another controller (to be referred to as a controller C hereinafter) (steps S10 and S11), acquires the information of a format conversion table supported by the controller C (step S13), and checks whether target format conversion can be performed by using the converting functions of the controllers A, B, and C (step S14). If possible (YES in step S14), format conversion is performed (step S15).

As described above, if the format conversion cannot be performed by the controller A itself, the controller A checks whether the format conversion can be performed by using another controller.

When target format conversion cannot be performed even by using all the controllers on the network and a maximum number of controllers on the implement, the controller stops data transmission and returns an error code to an application (step S12).

As a concrete example of the system described above, a case in which a disk device 5, a printer 6, an IRD (Integrated Receiver Decoder) 7 are network-connected through the IEEE 1394 bus 4 will be described below. In this case, the disk device 5 corresponds to a source device, the printer 6 corresponds to a destination device, and the IRD 7 corresponds to a controller.

The disk device 5 comprises an IEEE 1394 interface block 51, a disk drive (recording medium) 52, a memory 53, and a CPU 54 which are arranged in the disk device 5. The printer 6 comprises an IEEE 1394 interface block 61, a printer engine 62, a memory 63, and a CPU 64 which are arranged in the printer 6. The IRD 7 comprises an IEEE 1394 interface block 71, a data format selection/conversion block 72, a memory 73, a tuner 74, and a demultiplexer 75 which are arranged in the IRD 7.

Each of the devices has a list of data formats which can be transmitted and received by the corresponding device as a descriptor defined by an AV/C digital interface command set. The descriptors are mounted on the memory 53 or the disk drive 52 in the disk device 5, mounted on the memory 63 in the printer 6, and mounted on the memory 73 in the IRD 7. In the controller (IRD in FIG. 4), the data format information which can be transmitted and received is equivalent to the information of the list of convertible data formats.

Figure 5:
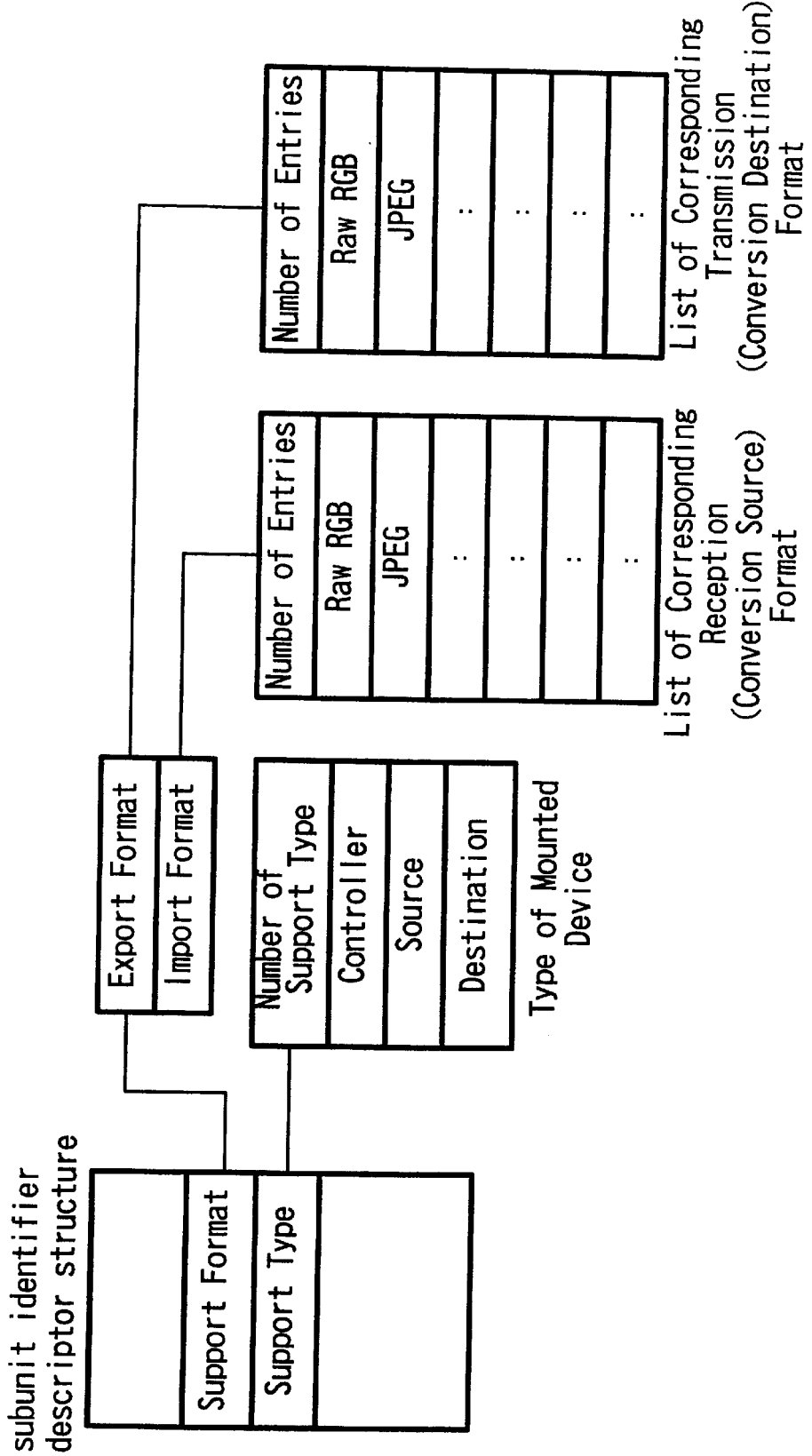
FIG. 5 is a diagram showing a model of a descriptor.

FIG. 5 shows a model of the descriptor. As shown in FIG. 5, the descriptor has a tree structure. It is dominated by the AV/C digital interface command set that a function held by a sub-unit (function unit in a device) defined by the IEEE 1394 is described in a sub-unit identifier descriptor. Therefore, function information required in this embodiment is included in FIG. 5 as an entry of the sub-unit identifier descriptor. In this descriptor, two entries constituted by a "support format" and a "support type" exist. The "support format" represents a format which can be received (in the destination device) or a supported format of format conversion source and a format which can be transmitted (in the source device) or a supported format of format conversion destination (in the controller). The "support type" represents one of the source, the destination, and the controller which is mounted on the device.

Figure 4:
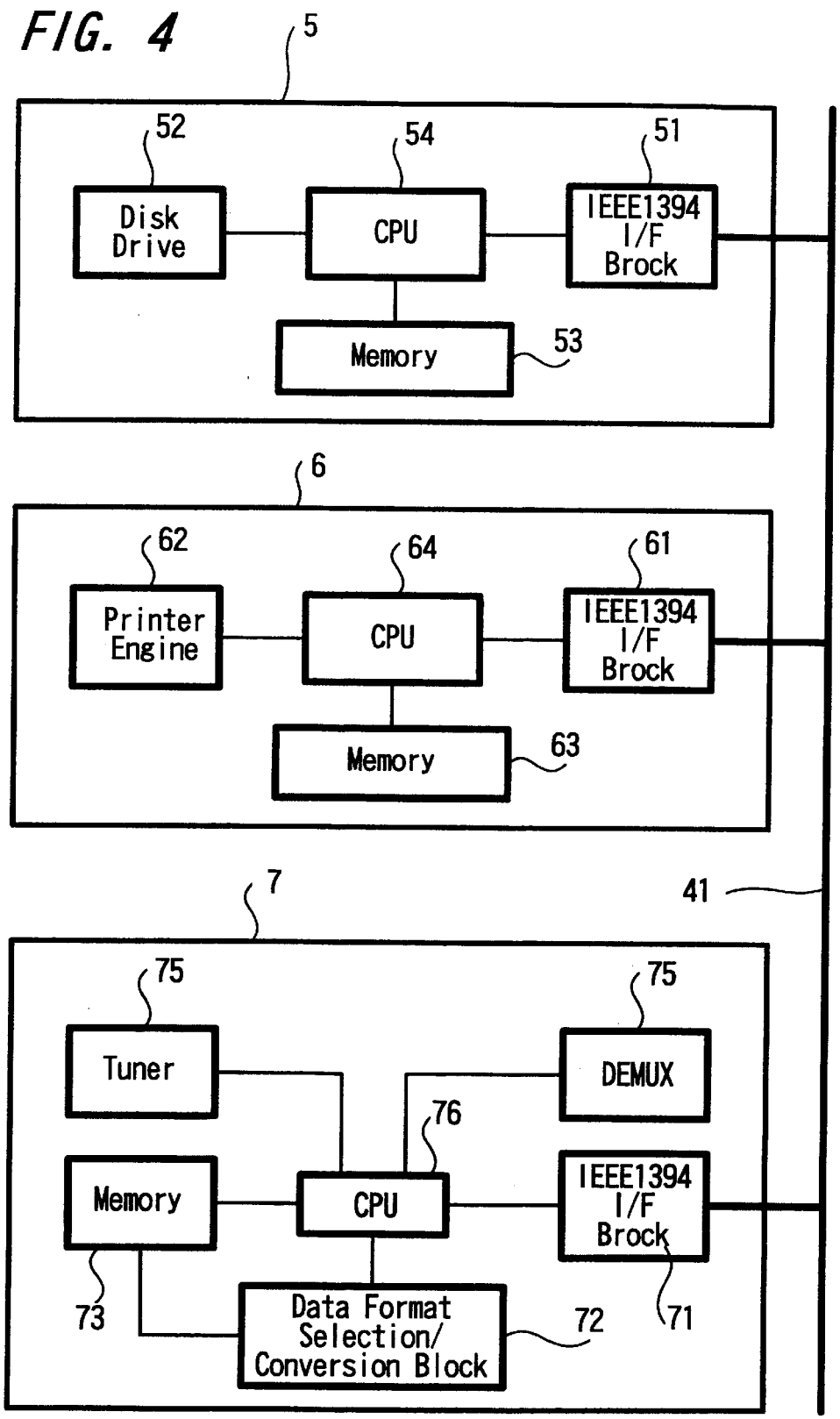
FIG. 4 is a block diagram showing network connection in which a disk device, a printer, and an IRD are connected through an IEEE 1394 bus.

In FIG. 4, the disk device 5 holds the data of still image in the disk drive 52 arranged in the disk device 5. The printer 6 receives still image data from the IEEE 1394 bus 4 to print the still image. The IRD 7 has a controller mounted thereon.

The disk device 5 serving as a source device has still image data as contents, and can transmit the data of a designated still image to another device by an external request through the network. When a still image is requested to be transmitted, the source device can prepare image data encoded in a format supported by the source device itself as transmission data. The device has the information of the supported format as a descriptor.

When the printer 6 serving as a destination device receives an image format supported by the printer 6 itself, the data can be printed in the printer engine 62. The information of the supported image format is stored in the memory 63 as a descriptor.

The IRD 7 having the function of the controller has a function for controlling data transmission between the source device and the destination device and a function for outputting a print request to the destination device. The IRD 7 comprises the type of a convertible data format conversion in the memory 73 as a descriptor.

As data transmission, Async transmission or Iso transmission of the IEEE 1394 is used. In the Iso transmission, data is transmitted by using a plug control register dominated by IEC 61883.

Figure 6:
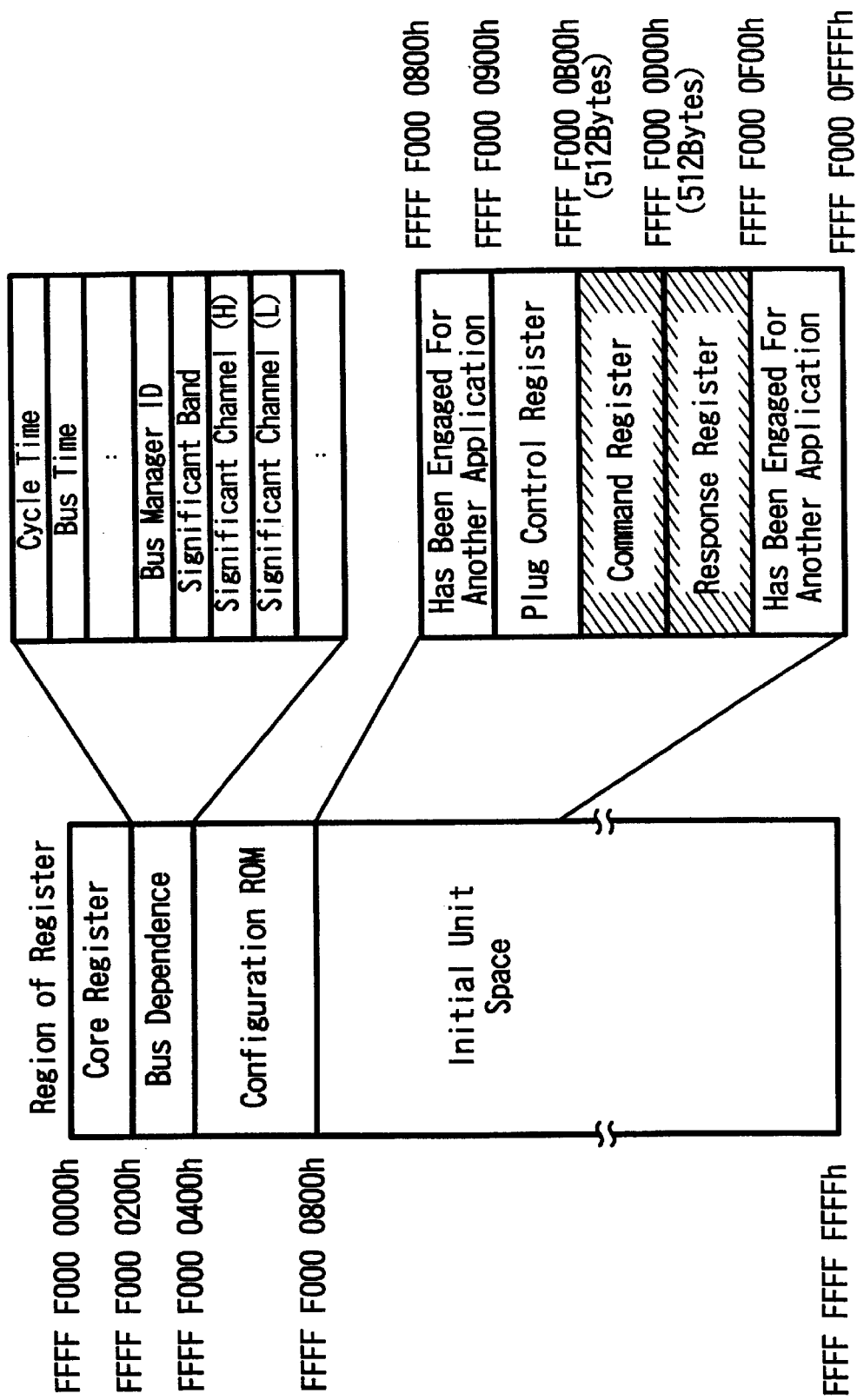
FIG. 6 is a diagram showing a CSR space.

In the Async transmission, data is transmitted by using a CSR (Control and Status Registers) space (more specifically, for example, and an initial unit space shown in FIG. 6) defined by IEEE 1212. More specifically, data transmission by the Async transmission is realized by using a method such as a method described in 1) or 2):

1) Push (PUSH) model; the source device writes data in the CSR space of the destination device, and
2) Pull (PULL) model; the source device prepares data in the CSR space of the source device itself, and the destination device loads the CSR space on the source device.

When a printing operation is performed in these devices, the following flow is performed.

The IRD 7 selects a still image to be printed from the disk device 5, and, at the same time, checks an image format which supports transmission from the descriptor of the disk device 5.

The IRD 7 checks an image format supported by the printer 6 from the descriptor of the printer 6.

The IRD 7 compares an image format supported by the disk device 5 with an image format supported by the printer 6 to check whether an image format supported by both the devices exist or not.

When the image format supported by both the devices exist, the IRD 7 performs data transmission between the disk device 5 and the printer 6 in the format. In the pull model, the IRD 7 instructs the disk device 5 to write the data of the format in a designated CSR space, and instructs the printer 6 to regard the data written in the CSR space by the disk device 5 as data of a designated image format to print the data.

On the other hand, when no format supported by both the devices exists, the IRD 7 itself refers to the information of the image conversion table mounted in the memory 73 to check whether the image data format supported by the disk device 5 can be converted into the image data format supported by the printer 6. When an image format A supported by the disk device 5 can be converted into an image format B supported by the printer 6, the IRD 7 instructs the disk device 5 to transmit data in the format A in the push model. The transmission destination is the CSR space of the IRD 7.

The IRD 7 converts the format of the received data into the format B, and transmits the data to the CSR space of the printer 6. The IRD 7 instructs the printer 6 to regard the data in the designated CSR space as data of the format B and to print the data.

When the image format A supported by the disk device 5 cannot be converted into the image format B supported by the printer 6, the IRD 7 tries to convert the image format into a target format through another controller on the network.

More specifically, when conversion from the format A into the format B is not supported, the IRD 7 searches for another controller (to be referred to as a controller B hereinafter) on the network. When the controller B exists, the IRD 7 acquires the information of a format conversion table of the controller B and uses the format converting functions of the IRD 7 and the controller B to check whether the format can be converted into a format in which data can be transmitted from the disk device 5 to the printer 6. If possible, the IRD 7 performs format conversion by using one or both of the functions of the IRD 7 and the controller B to transmit data from the disk device 5 to the printer 6.

If desired format conversion cannot be performed even by using the converting functions of the IRD 7 and the controller B, the IRD 7 searches for still another controller C, acquires the information of a format conversion table supported by the controller C, and checks whether target format conversion can be performed by using the converting functions of the IRD 7 and the controllers B and C. If possible, the IRD 7 performs the format conversion.

In this manner, a certain controller (the IRD 7 in FIG. 4) transmits data to another controller. The transmitted data is subjected to format conversion and transmitted to the next controller. Finally, the controller which controls the format into a format which can be received by the printer 6 transmits the data to the printer 6, and any controller instructs the printer 6 to regard as data in the CSR space as data in the format B and to print the data.

When target format conversion cannot be performed even by using all the controllers on the network and a maximum number of controllers which can be mounted, the controller stops data transmission and returns an error code to an application which instructs the controller to print data.

An embodiment which is applied on the assumption that the system described above is used will be described below in detail with reference to FIGS. 7 to 9.

In this embodiment, as in the examples shown in FIGS. 1 to 6, the present invention is applied to devices connected to each other through a bus of IEEE 1394 network. FIG. 7 is a block diagram showing the configuration of an IEEE 1394 network to which this embodiment is applied. In this embodiment, a with-controller-function source device 8 and a with-controller-function destination device 9 are connected to a IEEE 1394 bus 4. Each device comprises IEEE 1394 interface blocks 81 and 91 serving as interfaces for accessing other devices on the network through the IEEE 1394 bus 4.

At a point of time, a device for transmitting data on the IEEE 1394 network is used as a source device. The with-controller-function source device 8 of this embodiment comprises a source device block 82 and a controller device block 83, and the respective blocks 82 and 83 are connected to the IEEE 1394 interface block 81.

The source device block 82 comprises, as hardware, for example, a data source block, a block for holding the information of a transmittable data format, and a CPU. The configuration of the source device block 82 is basically the same as that of the source device 1 shown in FIG. 1. Since the IEEE 1394 interface block 81 is independently connected to the source device block 82, the source device block 82 does not require an IEEE 1394 interface block.

The controller device block 83 comprises, for example, a convertible data format information holding block, a device mounting information holding block, and a CPU. The configuration of the controller device block 83 is basically the same as the configuration of the controller 3 shown in FIG. 1 except for a data format conversion block and an IEEE 1394 interface block. More specifically, the controller device block 83 does not comprise a function for converting a data format.

At a point of time, a device for receiving data on the IEEE 1394 network is used as a destination device. The with-controller-function destination device 9 of this embodiment comprises a destination device block 92 and a controller device block 93, and the respective blocks 92 and 93 are connected to the IEEE 1394 interface block 91.

The destination function block 92 comprises, as hardware, for example, a data processing block, a block for holding the information of a receivable data format, and a CPU. The configuration of the destination device block 92 is basically the same as that of the destination device 2 shown in FIG. 1. Since the IEEE 1394 interface block 91 is independently connected to the destination device block 92, the destination device block 92 does not require an IEEE 1394 interface block.

The controller device block 93 comprises, for example, a convertible data format information holding block, a device mounting information holding block, and a CPU. The configuration of the controller device block 93 is basically the same as the configuration of the controller 3 shown in FIG. 1 except for a data format conversion block and an IEEE 1394 interface block. More specifically, the controller device block 93 does not comprise a function for converting a data format.

Figure 7:
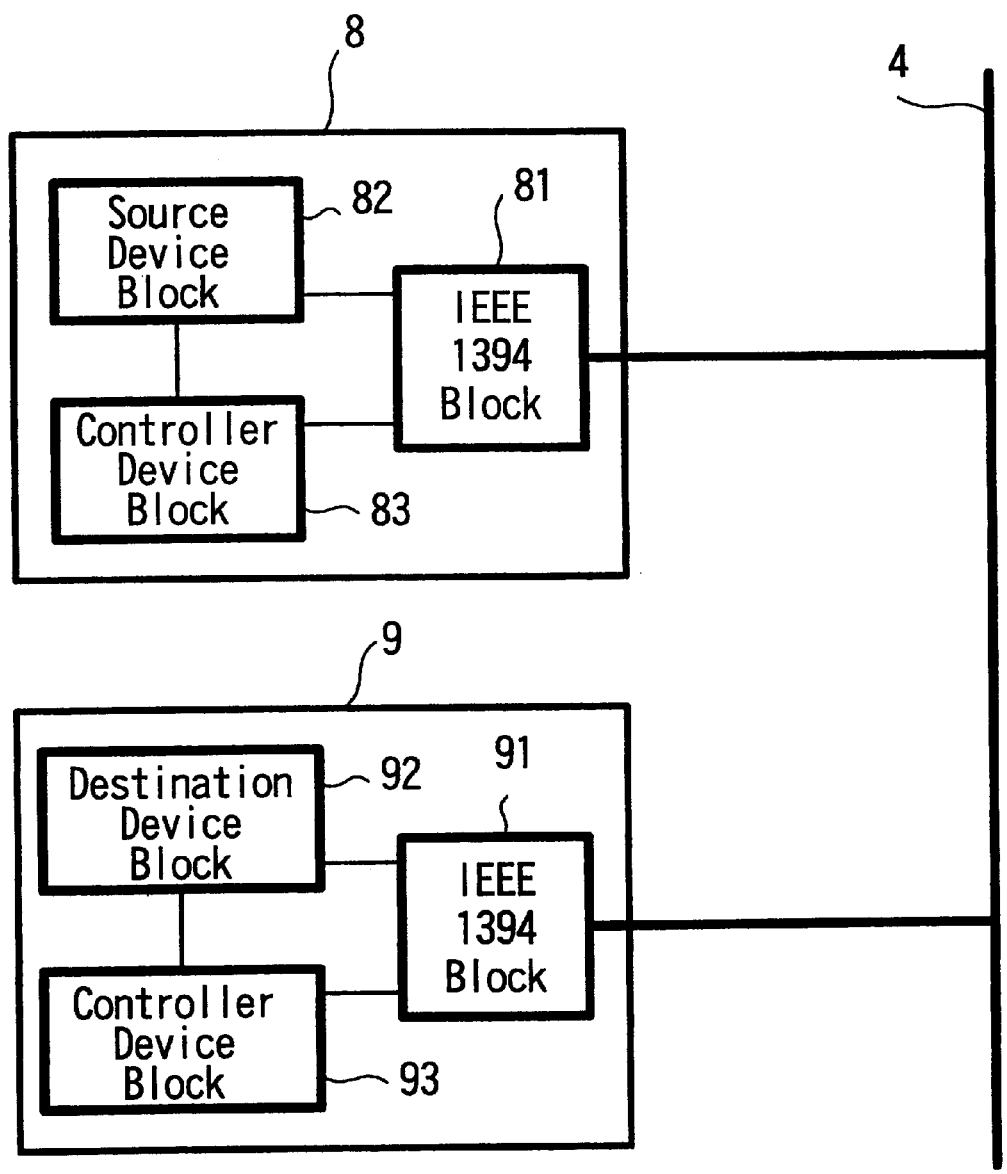
FIG. 7 is a block diagram showing a configuration of an IEEE 1394 network to which the present invention is applied.

Although not shown in FIG. 7, a format converter which is independent of the source device 8 or the destination device 9 is connected to the IEEE 1394 bus 4 of this embodiment. This format converter is connected to the IEEE 1394 bus 4 through the IEEE 1394 interface block. The format converter converts the format of data transmitted through the IEEE 1394 bus 4 to transmit the data to the IEEE 1394 bus 4. The format converter may be a device which is integrated with a device having any data processing block. The controller device blocks 83 or 93 included in the source device 8 or the destination device 9 may comprise a data format converting function.

The software configurations of the devices will be described below.

The functions of the devices will be described below.

When the source device block receives a command for data transmission together with parameters such as data format and a data transmission destination from an external device, the source device block starts data transmission to the designated transmission destination in the designated format. In addition, according to a request from an external device, the source device block provides the information of the format of transmittable data.

When a reception data format is designated by an external device, the destination device block sets up a reception buffer (CSR space) to prepare reception in the designated format, and receives data. According to a request from an external device, the destination device block provides the information of a receivable data format.

The controller device block has at least functions described in items (1) to (4):

(1) the function for checking functions mounted on the devices on the network;
(2) the function for instructing and controlling the devices on the network to perform data transmission;
(3) the function for transmitting and receiving data; and
(4) the function for controlling the operations of a device for transmitting data and a device for receiving data.

The format converter of this embodiment also has at least the functions described in items (1) to (3):

(1) the function for converting the format of data;
(2) the function, having the information of a convertible data format, for providing the information according to a request; and
(3) the function for transmitting and receiving data.

Figure 8:
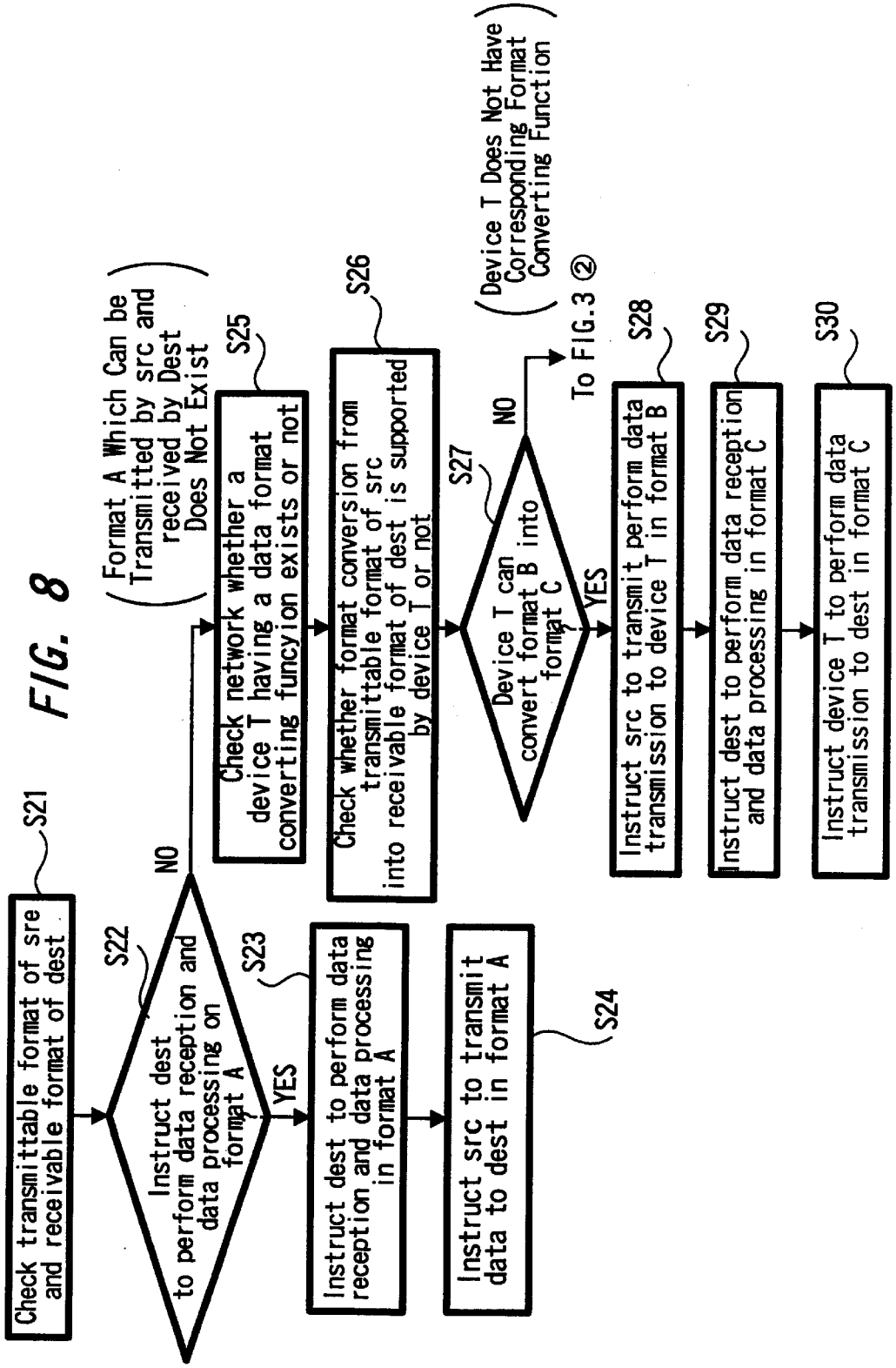
FIG. 8 is one part of a flow chart showing a case in which data is transmitted from a source device to a destination device.

The flow chart of the process of transmitting data from the source device to the destination device in this embodiment is shown in FIGS. 8 and 9. In this flow chart, reference symbol "src" denotes a source device, reference symbol "dest" denotes a destination device, reference symbol "controller" denotes a controller, and reference symbol "T" denotes a format converter.

The controller acquires the information of a transmittable data format of the source device and the information of a receivable data format of the destination device when the controller instructs the source device to perform data transmission from the source device to the destination device (step S21).

On the basis of the information, it is checked whether a data format (defined as a format A) which can be transmitted by the source device and can be received by the destination device exists (step S22). If the format A exists, the controller informs the destination device of the format of data transmitted from the source device, instructs the destination device to receive the data in the format (step S23), and instructs the source device to transmit the data to the destination device in the corresponding format (step S24).

If the format A is not detected in step S22, the controller interrupts data transmission from the source device to the destination device to check whether a device T having a data format converting function exists or not (step S25).

Here, if the device T having the format converting function exists, it is checked whether conversion from a data format which can be transmitted by the source device into a data format which can be received by the destination device is supported by the device T (steps S26, S27). The format which can be transmitted by the source device is defined as a format B, and the format which can be received by the destination device is defined by a format C.

If the device T can convert the format B into the format C, the controller instructs the source device to perform data transmission to the device T in the format B (step S28), and instructs the destination device to perform data reception in the format C and processing of the received data (step S29). The controller instructs the device T to convert the data received in the format B into data of the format C and to transmit the converted data to the destination device (step S30).

If it is determined in step S27 whether the checked device T does not have the function for converting the format B into the format C, the controller shifts to the process in the flow chart in FIG. 9. More specifically, on the network connected to the bus 4, the controller searches for another device having a data format converting function (step S31). In this searching, it is checked whether a device having another format converting function exists or not (step S32). If the device exists, the controller checks whether the device has the function for converting the format B into the format C or not (step S33), and checks whether the format B can be converted into the format C or not (step S34). If it is determined that the conversion cannot be performed, the controller returns to step S31 to search for a device having still another converting function.

If it is determined the conversion can be performed, the controller instructs the source device to perform data transmission to the converter in the format B and instructs the destination device to perform data reception in the format C and processing of the received data. The controller instructs the converter to convert the data received in the format B into data of the format C and to transmit the converted data to the destination device (step S35).

If it is determined in step S32 that a device having another format converting function does not exist, the controller stops the data transmission and returns an error code to the application (step S36).

As a concrete example of the system described above, the configuration which has been described above as shown in FIG. 4 can be applied. More specifically, a disk device 5, a printer 6, and an IRD (Integrated Receiver Decoder: so-called multi-functioned digital broadcast receiver) 7 are connected by IEEE 1394 bus 4 to each other through a network. The disk device 5 corresponds to a with-controller-function source device, the printer 6 corresponds to a with-controller-function destination device, and the IRD 7 corresponds to a data converter.

The present invention can also be applied to a configuration in which devices other than the disk device 5, the printer 6, and the IRD 7 are network-connected through a bus. More specifically, according to the present invention, in a model in which a source device having data subjected to other various types of transmission and a destination device for processing and holding data are connected, format conversion and processing of data transmitted by a method equivalent to the method described above can be performed.

A model which can be applied will be illustrated below.

(1) A digital still camera is used as the source device, and a digital still camera is used as the destination device.

In this case, an image memory included in the digital still camera may be conceivable as a data transmission source, and an image memory or a liquid-crystal display included in the digital still camera may be conceivable as a data transmission destination.

(2) A camera-integrated video tape recorder or a video tape recorder is used as the source device, and a camera-integrated video tape recorder or a video tape recorder is used as the destination device.

In this case, an image memory or recording medium included in the camera-integrated video tape recorder or the video tape recorder may be conceivable as a data transmission source, and an image memory, a liquid-crystal display, or a recording medium included in the camera-integrated video tape recorder or the video tape recorder may be conceivable as a data transmission destination.

(3) A facsimile device or an image scanner may be conceivable as the source device, and a scanning buffer may be conceivable as the data transmission destination.

(4) A facsimile device, a digital copying machine, or the like may be conceivable as the destination device, and a printing unit of the device may be conceivable as a digital transmission destination.

(5) A disk device may be conceivable as the destination device, and a recording medium may be conceivable as a disk transmission destination.

In addition, these devices may also be used as data converters by using the data converting functions included in the devices.

As has been described above in detail, according to the present invention, the advantages described in items (1) and (2) can be achieved.

(1) In data transmission from the source device to the destination device, the difference between supported data formats can be absorbed by conversion performed by a format converter which is independent of the controller.

(2) When data to be transmitted have a large number for formats, the source and destination devices need not be cope with the large number of data formats to perform data transmission, and format converters connected to a network may cope with the large number of formats. For this reason, a reduction in cost can be achieved in the scale of network.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An electronic device on a communication network having a bus and a plurality of electronic devices connected to the bus, the device comprising:

acquisition means for acquiring first data format information of data which can be processed by a first electronic device on the network and for acquiring second data format information of data which can be processed by a second electronic device on the network;

detecting means for detecting, on the basis of the acquired first and second data format information, whether the data which can be processed by the first electronic device can be processed by the second electronic device;

searching means, operable if it is detected by the detecting means that the data which can be processed by the first electronic device cannot be processed by the second electronic device, for searching for and identifying an electronic device of the plurality of electronic devices which can convert data which can be processed by the first electronic device into data having a format which can be processed by the second electronic device; and control means operable, when the electronic device which can convert data which can be processed by the first electronic device into data having the format which can be processed by the second electronic device is identified by the searching means, for controlling the first electronic device to output data to the identified electronic device and for controlling the identified electronic device to output converted data to the second electronic device.

2. The electronic device according to claim 1, wherein the searching means comprises:

format converter searching means for searching the network for and identifying an electronic device of the plurality of electronic devices which can convert a format of the data; and format conversion detecting means for detecting whether the electronic device identified by the format converter searching means can convert data which can be processed by the first electronic device into data having a format which can be processed by the second electronic device.

3. The electronic device according to claim 2, wherein if it is detected by the format conversion detecting means that the identified electronic device cannot convert data which can be processed by the first electronic device into data having a format which can be processed by the second electronic device, the format converter searching means comprises means for searching the network for another electronic device of the plurality of electronic devices which can convert a format of data.

4. A system formed of a communication network having a bus and a plurality of electronic devices connected to the bus, the system comprising a third electronic device for acquiring first data format information of data which can be processed by a first electronic device on the network and second data format information of data which can be processed by a second electronic device on the network, wherein the third electronic device includes:

detecting means for detecting, on the basis of the data format information acquired by the third electronic device, whether data which can be processed by the first electronic device can be processed by the second electronic device;

searching means operable, if it is detected by the detecting means that data which can be processed by the first electronic device cannot be processed by the second electronic device, for searching for and identifying an electronic device of the plurality of electronic devices which can convert data which can be processed by the first electronic device into data which can be processed by the second electronic device; and control means, operable when an electronic device which can convert data which can be processed by the first electronic device into data which can be processed by the second electronic device is identified by the searching means, for controlling the first electronic device to output data to the identified electronic device and controlling the detected electronic device to output converted data to the second electronic device.

5. The system according to claim 4, wherein the searching means comprises:

format converter searching means for searching the network for and identifying an electronic device of the plurality of electronic devices which can convert a format of data; and format conversion detecting means for detecting whether the electronic device identified by the format converter searching means can convert data which can be processed by the first electronic device into data having the format which can be processed by the second electronic device.

6. The system according to claim 5, wherein if it is detected by the format conversion detecting means that the identified electronic device cannot convert data which can be processed by the first electronic device into data having the format which can be processed by the second electronic device, the third electronic device comprises means for searching the network for another electronic device of the plurality of electronic devices which can convert a format of data.

7. A communication method on a communication network having a bus and a plurality of electronic devices connected to the bus, the method comprising:

an acquisition step of acquiring first data format information of data which can be processed by a first electronic device on the network and acquiring second data format information of data which can be processed by a second electronic device on the network;

a detecting step of detecting, on the basis of the acquired first and second data format information from the acquisition step, whether data which can be processed by the first electronic device can be processed by the second electronic device;

a searching step of, if it is detected in the detecting step that data which can be processed by the first electronic device cannot be processed by the second electronic device, searching for and identifying an electronic device of the plurality of electric devices which can convert data which can be processed by the first electronic device into the data having a format which can be processed by the second electronic device; and a control step of, when the electronic device which can convert data which can be processed by the first electronic device into data having a format which can be processed by the second electronic device is identified by the searching step, controlling the first electronic device to output data to the identified electronic device and controlling the detected electronic device to output converted data to the second electronic device.

8. The communication method according to claim 7, wherein
the searching step comprises:
a format converter searching step of searching for and identifying an electronic device of the plurality of electronic devices which can convert a format of the data; and
a format conversion detection step of detecting whether the electronic device identified in the format converter searching step can convert data which can be processed by the first electronic device into data having a format which can be processed by the second electronic device.

9. The communication method according to claim 8, wherein
if it is detected in the format conversion decision step that the identified electronic device cannot convert data which can be processed by the first electronic device into data having the format which can be processed by the second electronic device, the format converter searching step further searches the network for another electronic device of the plurality of electronic devices which can convert a format of data.

10. A recording medium which records a program for performing communication on a communication network having a bus and a plurality of electronic devices, wherein
the program comprises:
an acquisition step of acquiring first data format information of data which can be processed by a first electronic device on the network and acquiring second data format information of data which can be processed by a second electronic device on the network;
a detecting step of detecting, on the basis of the acquired first and second data format information from the acquisition step, whether data which can be processed by the first electronic device can be processed by the second electronic device;
a searching step of, if it is detected in the detecting step that data which can be processed by the first electronic device cannot be processed by the second electronic device, searching for and identifying an electronic device of the plurality of electronic devices which can convert data which can be processed by the first electronic device into data having a format which can be processed by the second electronic device; and
a control step of, when the electronic device which can convert data which can be processed by the first electronic device into data having a format which can be processed by the second electronic device is identified by the searching step, controlling the first electronic device to output data to the detected electronic device and controlling the detected electronic device to output converted data to the second electronic device.

11. The recording medium according to claim 10, wherein
the searching step of the program comprises:
a format converter searching step of searching the network for and identifying an electronic device of the plurality of electronic devices which can convert a format of the data; and a format conversion detecting step of detecting whether the electronic device identified in the format converter searching step can convert data which can be processed by the first electronic device into data having a format which can be processed by the second electronic device.

12. The recording medium according to claim 11, wherein
if it is detected in the format conversion detecting step of the program that the identified electronic device cannot convert data which can be processed by the first electronic device into data having a format which can be processed by the second electronic device, the format converter searching step further searches the network for another electronic device of the plurality of electronic devices which can convert a format of data.

13. An electronic device on a communication network having a bus and a plurality of electronic devices connected to the bus, the device comprising:
means for checking whether the plurality electronic devices on the network can perform a function for converting a format of data; and
means for holding information of a format of convertible data; and
means for instructing and controlling the plurality of electronic devices on the network to transmit data.

14. An electronic device on a communication network having a bus and a plurality of electronic devices connected to the bus, the device comprising:
means for holding format information of convertible data;
inputting means for receiving a control signal from another electronic device of the plurality of electronic devices; and
conversion means for converting a format of data input through the bus to output converted data to the bus.

15. A data communication method for performing data communication on a communication network having a bus and a plurality of electronic devices connected to the bus, the method comprising:
a step of causing a controller to acquire information of a transmittable data format of a source device and information of a receivable data format of a destination device and to determine a transmission data format with reference to the acquired information;
a step of, when the transmittable data format of the source device cannot be received by the destination device, causing the controller to search for and identify another electronic device of the plurality of electronic devices connected to the bus and having a data format converting function;
a step of determining a transmission data format with reference to a data format which can be converted by the identified electronic device having the format converting function;
a step of instructing the source device to transmit data to the identified electronic device having the format converting function; and
a step of causing the identified electronic device which receives data and has the format converting function to convert a format of the data and to transmit the converted data to the destination device.

* * * * *